US012191557B2

(12) United States Patent
Wu et al.

(10) Patent No.: US 12,191,557 B2
(45) Date of Patent: Jan. 7, 2025

(54) ELECTRONIC DEVICE

(71) Applicant: PEGATRON CORPORATION, Taipei (TW)

(72) Inventors: Chien-Yi Wu, Taipei (TW); Hau Yuen Tan, Taipei (TW); Chao-Hsu Wu, Taipei (TW); Chen-Kuang Wang, Taipei (TW); Chih-Fu Chang, Taipei (TW); Tsung-Chi Tsai, Taipei (TW); Shih-Keng Huang, Taipei (TW); Tse-Hsuan Wang, Taipei (TW); Sheng-Chin Hsu, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 252 days.

(21) Appl. No.: 17/886,462

(22) Filed: Aug. 12, 2022

(65) Prior Publication Data

US 2023/0093423 A1 Mar. 23, 2023

(30) Foreign Application Priority Data

Sep. 17, 2021 (TW) ................................ 110134774

(51) Int. Cl.
*H01Q 1/24* (2006.01)
*H01Q 1/48* (2006.01)
*H01Q 5/364* (2015.01)

(52) U.S. Cl.
CPC ................ *H01Q 1/24* (2013.01); *H01Q 1/48* (2013.01); *H01Q 5/364* (2015.01)

(58) Field of Classification Search
CPC .......... H01Q 1/24; H01Q 1/48; H01Q 9/0421; H01Q 21/28; H01Q 5/364
See application file for complete search history.

(56) References Cited

U.S. PATENT DOCUMENTS 10,446,915 B2 * 10/2019 Chen ...................... H01Q 1/243
10,542,130 B1 * 1/2020 Lo ......................... H04M 1/026
11,843,186 B2 * 12/2023 Tan ....................... H01Q 5/371
(Continued)

FOREIGN PATENT DOCUMENTS

TW 202010178 3/2020
TW I688159 3/2020

*Primary Examiner* — Dimary S Lopez Cruz
*Assistant Examiner* — Austin M Back
(74) *Attorney, Agent, or Firm* — J.C. PATENTS

(57) ABSTRACT

An electronic device includes a metal back cover and an antenna module. The metal back cover includes a slot. The antenna module is located in the metal back cover. The antenna module includes a first radiator, second radiator, third radiator, fourth radiator, and fifth radiator. The first radiator has a feeding end. The second radiator connected to the first radiator has a contact portion which is connected to the metal back cover. The third radiator is connected to the second radiator and is located beside the first radiator. The third radiator has a first grounding terminal. The fourth radiator is connected to the second radiator and has a second grounding terminal. The fifth radiator is connected to the third radiator and the fourth radiator. Distances between the feeding end and the slot, the first grounding terminal and the slot, and the second grounding terminal and the slot all range from 3.5 mm to 10 mm.

10 Claims, 7 Drawing Sheets

(56) References Cited

U.S. PATENT DOCUMENTS

| | | | | |
|---|---|---|---|---|
| 2013/0157586 | A1* | 6/2013 | Saito | H04B 1/40 455/73 |
| 2015/0002340 | A1* | 1/2015 | Liou | H01Q 9/42 343/700 MS |
| 2020/0127384 | A1* | 4/2020 | Thakur | H01Q 1/2266 |
| 2022/0052437 | A1* | 2/2022 | Lee | H01Q 21/28 |
| 2022/0382327 | A1* | 12/2022 | Kim | H01Q 9/30 |

* cited by examiner

ELECTRONIC DEVICE

CROSS-REFERENCE TO RELATED APPLICATION

This application claims the priority benefit of Taiwan application serial no. 110134774, filed on Sep. 17, 2021. The entirety of the above-mentioned patent application is hereby incorporated by reference herein and made a part of this specification.

BACKGROUND

Technology Field

The disclosure relates to an electronic device, and particularly, to an electronic device with an antenna module.

Description of Related Art

Currently, if a metal back cover is adopted in a tablet device, it is difficult for an internal antenna to perform well due to the influence of the metal back cover.

SUMMARY

The disclosure provides an electronic device with a metal back cover and an antenna module with favorable performance.

An electronic device of the disclosure includes a metal back cover and an antenna module. The metal back cover includes a slot. The antenna module is disposed in the metal back cover, and the antenna module includes a first radiator, a second radiator, a third radiator, a fourth radiator, and a fifth radiator. The first radiator has a feeding end. The second radiator is connected to the first radiator and has a contact portion, and the contact portion is connected to the metal back cover. The third radiator is connected to the second radiator and disposed beside the first radiator, and the third radiator includes a first grounding terminal. The fourth radiator is connected to the second radiator, the third radiator is disposed between the first radiator and the fourth radiator, and the fourth radiator includes a second grounding terminal. The fifth radiator is connected to the third radiator and the fourth radiator. The feeding end, the first grounding terminal, and the second grounding terminal are all apart from the slot in a distance ranging from 3.5 mm to 10 mm so that the effect of the metal back cover on the performance of the antenna module is reduced.

In an embodiment of the disclosure, the metal back cover includes a bottom wall and a side wall connected to the bottom wall, and the slot is formed between the bottom wall and the side wall.

In an embodiment of the disclosure, the contact portion is connected to the metal back cover through a conductor. The slot includes a first end and a second end opposite to each other. A distance between a projection of the conductor onto the bottom wall and a projection of the first end onto the bottom wall ranges from 45 mm to 55 mm, and a distance between the projection of the conductor onto the bottom wall and a projection of the second end onto the bottom wall ranges from 15 mm and 25 mm.

In an embodiment of the disclosure, the antenna module excites at a frequency band, and a length of the slot ranges from 0.5 times a wavelength of the frequency band to 0.75 times the wavelength of the frequency band.

In an embodiment of the disclosure, the contact portion is connected to the metal back cover through a conductor, and the contact portion is disposed between a position of the second radiator connected to the third radiator and a portion of the second radiator connected to the fourth radiator.

In an embodiment of the disclosure, the second radiator includes a third end and a fourth end disposed opposite to each other. The fourth radiator is close to the fourth end and away from the third end. A distance between the contact portion and the third end ranges from 25 mm and 35 mm, and a distance between the contact portion and the fourth end ranges from 7 mm to 15 mm.

In an embodiment of the disclosure, the electronic device further includes a bracket and a circuit board. The bracket and the circuit board are disposed in the metal back cover. The antenna module is disposed on multiple surfaces of the bracket. The feeding end, the first grounding terminal, and the second grounding terminal face and are connected to the circuit board.

In an embodiment of the disclosure, the surfaces of the bracket include a first surface, a second surface, and a third surface connected in sequence. The third surface is disposed close to the circuit board, the first surface is disposed away from the circuit board, and the second radiator is disposed on the first surface. Part of the first radiator, part of the third radiator, and part of the fourth radiator are disposed on the second surface. The feeding end, the first grounding terminal, the second grounding terminal, and the fifth radiator are disposed on the third surface.

In an embodiment of the disclosure, the metal back cover includes a bottom wall, and a distance between the first surface and the bottom wall ranges from 6 mm to 10 mm.

In an embodiment of the disclosure, the electronic device further includes an insulating inner case disposed in the metal back cover. The insulating inner case includes multiple air outlets, the air outlets are connected to the slot, and the insulating inner case is plastic.

In summary, the electronic device of the disclosure adopts a metal back cover and has a high-quality appearance. In a conventional electronic device with a metal back cover, the antenna performance is affected by the metal back cover, and the power of the antenna module may converge in the direction toward the front of the electronic device. In the electronic device of the disclosure, a slot is disposed on the metal back cover, so that the power of the antenna module is not convergent in a single axis, and the antenna performance can be improved. In addition, with the design that the antenna module is connected to the metal back through the contact portion, the coverage of the radiation signal in the direction of the sidewall of the electronic device can be increased. Furthermore, since the distance between the slot and any of the feeding end, the first grounding terminal, and the second grounding terminal of the antenna module in the metal back cover ranges from 4.5 mm to 10 mm, there is a certain distance kept between the antenna module and the metal back cover, and the effect of the metal back cover on the performance of the antenna module can be reduced, which is also different from the conventional resonance mechanism in which the antenna is disposed closely next to the slot. In addition, the design of the antenna module can excite and resonate at Wi-Fi 6E frequency band (5150-7125 MHz).

DESCRIPTION OF THE EMBODIMENTS

Figure 1:
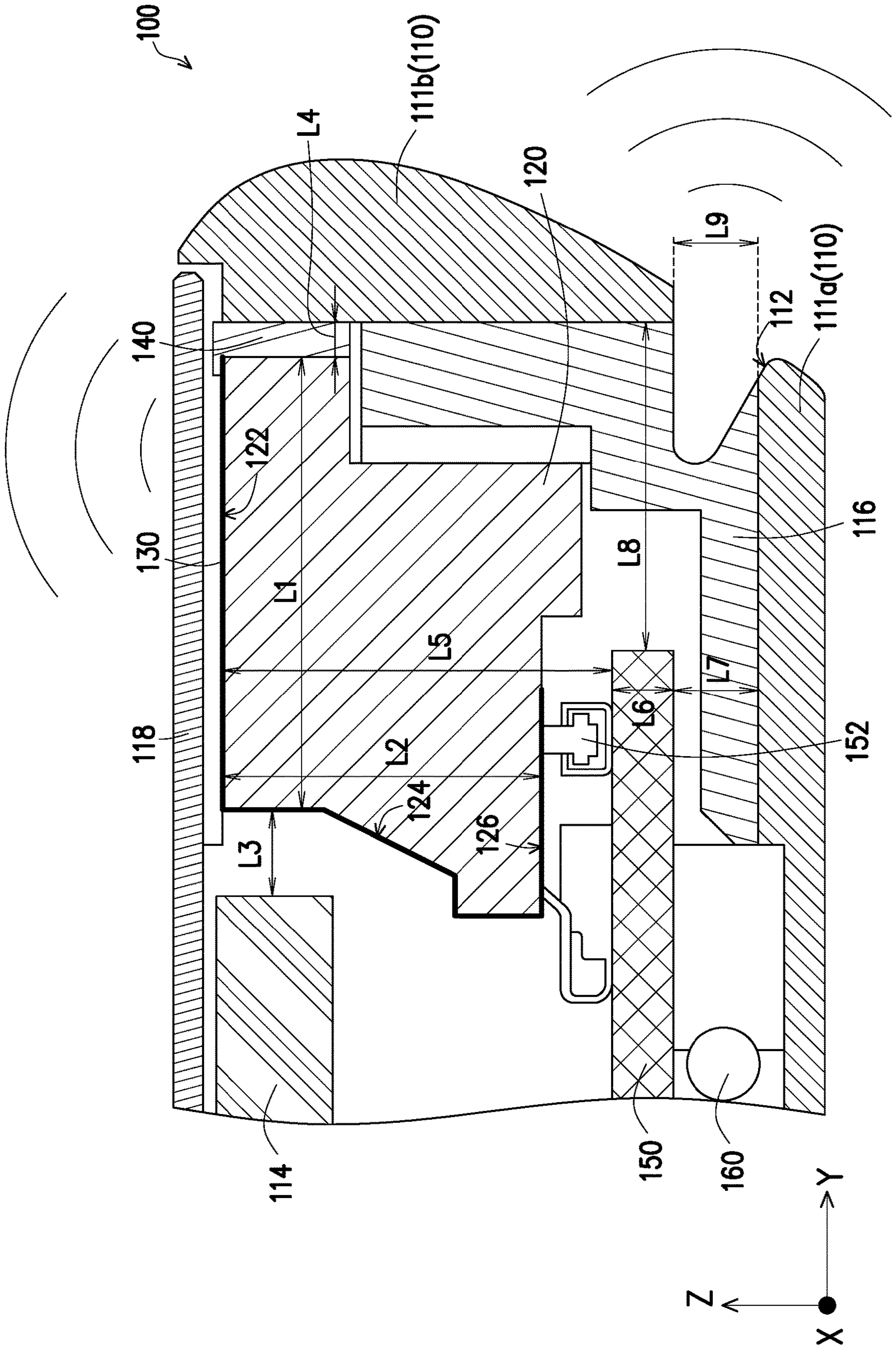
FIG. 1 is a cross-sectional schematic view of part of an electronic device according to an embodiment of the disclosure.

FIG. 1 is a cross-sectional schematic view of part of an electronic device according to an embodiment of the disclosure. Referring to FIG. 1, in the embodiment, an electronic device 100 is a tablet computer, for example. FIG. 1 is a partial cross-section of a frame area of the antenna module close to the metal back cover. In other embodiments, the electronic device 100 may be a laptop computer, and the type of the electronic device 100 is not limited thereto.

The electronic device 100 includes a metal back cover 110 and an antenna module 130. The metal back cover 110 includes a bottom wall 111*a* and a side wall 111*b* connected to the bottom wall 111*a*, and a slot 112 is formed between the bottom wall 111*a* and the side wall 111*b*. The antenna module 130 is disposed in the metal back cover 110. Specifically, in the embodiment, the electronic device 100 further includes a bracket 120, and, for example, the bracket 120 is an insulating material, such as plastic. The antenna module 130 is formed on multiple surfaces of the bracket 120 by lase direct structuring (LDS), for example, or is fixed on the multiple surfaces of the bracket 120 by bonding.

The surfaces of the bracket 120 include a first surface 122, a second surface 124, and a third surface 126, which are connected in sequence. The third surface 126 is disposed close to a circuit board 150. The first surface 122 is disposed away from the circuit board 150. The antenna module 130 extends from the first surface 122 to the third surface 126 through the second surface 124. The electronic device 100 further includes the circuit board 150, such as an antenna circuit board, disposed below the bracket 120. The antenna module 130 is connected to the circuit board 150 through an elastic piece 152.

The width L1 of the bracket 120 is, for example, 6.5 mm. The height L2 is, for example, 4.5 mm. The length (not shown) is, for example, 176.4 mm. The distance L3 between the antenna module 130 and a touch module 114 (metal) ranges from 0.5 mm to 1.5 mm, for example, 1.2 mm. The distance L4 between the antenna module 130 and the side wall 111*b* ranges from 0.4 mm to 1.5 mm, for example, 0.5 mm.

The distance L5 between the first surface 122 of the bracket 120 and the circuit board 150 is, for example, 5.6 mm. The thickness L6 of the circuit board 150 is, for example, 0.85 mm. The distance L7 from the circuit board 150 to the bottom wall 111*a* is, for example, 1.65 mm. Therefore, in the embodiment, the distance L13 (the sum of the distance L5, the distance L6, and the distance L7 shown in FIG. 2) between the first surface 122 of the bracket 120 and the bottom wall 111*a* ranges from 6 mm to 10 mm, for example, about 8.1 mm. In addition, the distance L8 from the circuit board 150 to the side wall 111*b* is, for example, 4.7 mm. The width L9 of the slot 112 is about 1.81 mm.

Note that in a conventional electronic device with a metal back cover, the antenna performance is affected by the metal back cover and the power of the antenna module may be convergent in the direction (Z direction) toward the front of the electronic device. The electronic device 100 of the embodiment not only adopts the metal back cover 110 but also has a fine-looking appearance. The slot 112 is disposed on the metal back cover 110, so that the power of the antenna module 130 may not be convergent in a single axis (e.g., the Z direction).

Specifically, in the embodiment, the antenna module 130 is, for example, an antenna of Wi-Fi 6E, which can excite at multiple frequency bands, such as Wi-Fi 2.4 GHz (2400-2500 MHz) and Wi-Fi 5G and 6G (5150-7125 MHz). The signals of Wi-Fi 5G and 6G (5150-7125 MHz) are transmitted in the Z direction (the direction of the front cover 118), and the power of Wi-Fi 2.4G can be transmitted in the Y direction (the direction of the side wall 111*b*) through the slot 112.

Figure 2:
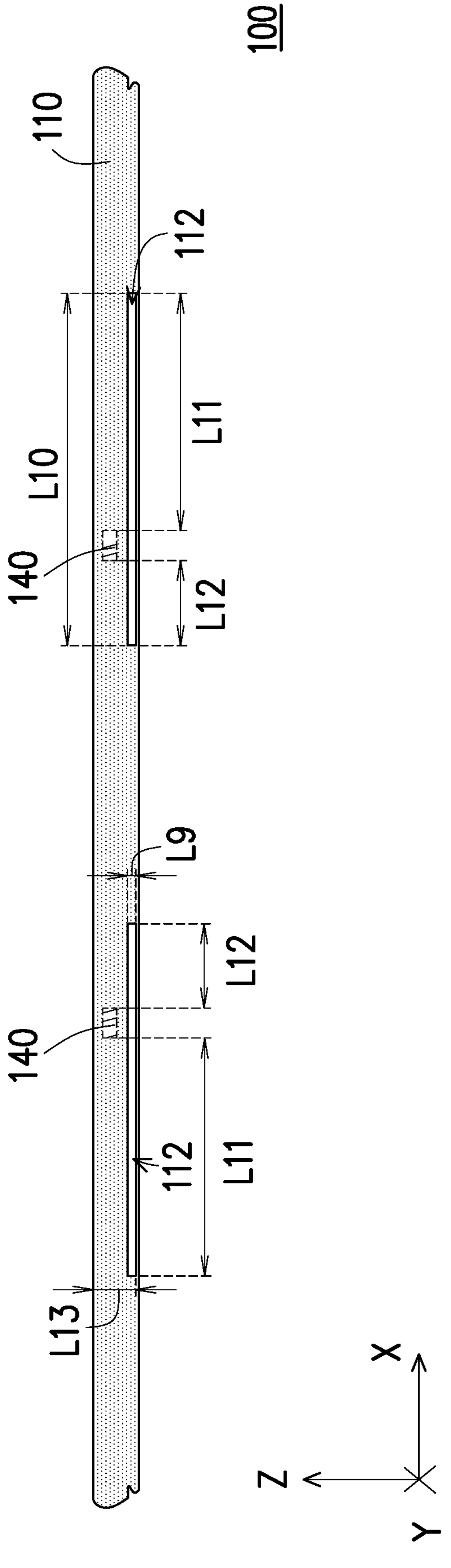
FIG. 2 is a side view of the electronic device of FIG. 1.

Specifically, FIG. 2 is a side view of the electronic device of FIG. 1. Referring to FIG. 2, in the embodiment, the length L10 of the slot 112 ranges from 0.5 times the wavelength to 0.75 times the wavelength of the Wi-Fi 2.4 GHz (2400-2500 MHz) frequency band. Such a design allows the power of Wi-Fi 2.4G to be transmitted in the Y direction (the direction of the side wall 111*b*) through the slot 112 so as to have favorable performance, therefore effectively reducing the chance of poor antenna efficiency resulting from the metal back cover 110 shielding the low frequency (2.4 GHz).

In addition, according to FIG. 2, the electronic device 100 includes two slots 112, and two corresponding conductors 140 connect the two antenna modules 130 (one antenna module 130 is illustrated in FIG. 1) to the metal back cover 110. Each antenna module 130 has a corresponding slot 112 and comes with the foregoing advantages.

Figure 7:
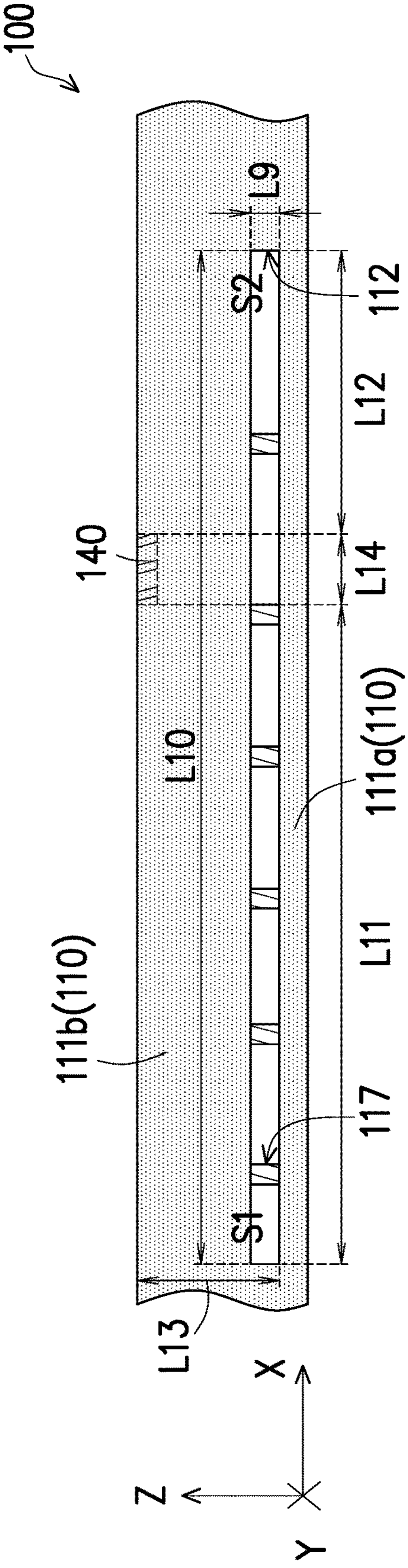
FIG. 7 is a partial view of a side wall of the electronic device of FIG. 1 from outside-in perspective.

In addition, the slot 112 includes a first end S1 (as shown in FIG. 7) and a second end S2 (as shown in FIG. 7) opposite to each other. The distance L11 between the projection of the conductor 140 onto the bottom wall 111*a* and the projection of the first end S1 onto the bottom wall 111*a* (as shown in FIG. 7) ranges from 45 mm to 55 mm, for example, 50 mm. The distance L12 between the projection of the conductor 140 onto the bottom wall 111*a* and the projection of the second end S2 onto the bottom wall 111*a* ranges from 15 mm to 25 mm, for example, 20 mm. The distance L11 and the distance L12 falling within the foregoing ranges have much favorable antenna efficiency and coverage range to the antenna module 130.

Figure 3:
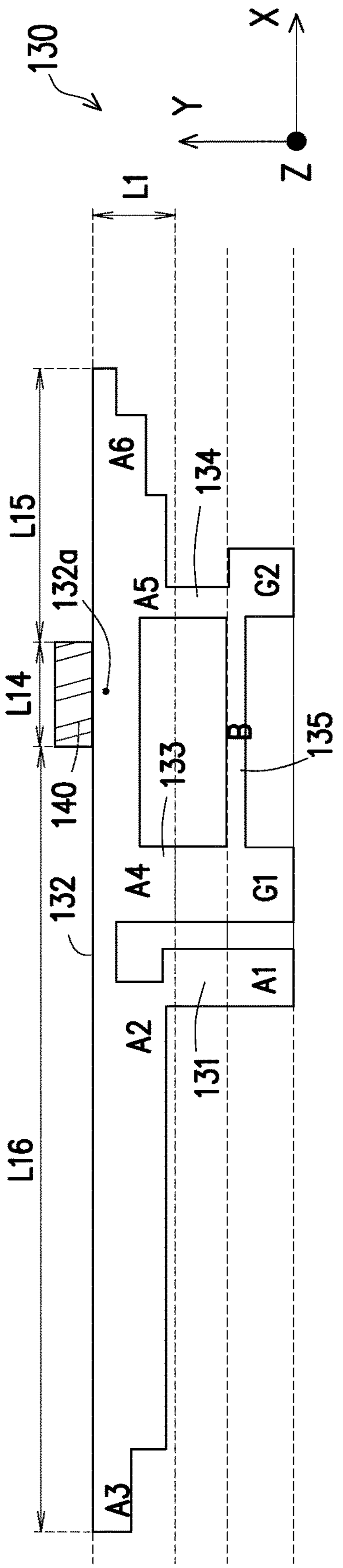
FIG. 3 is a schematic view of an antenna module of the electronic device of FIG. 1.

The pattern of the antenna module 130 is illustrated in the subsequent paragraphs. FIG. 3 is a schematic view of an antenna module of the electronic device of FIG. 1. Referring to FIG. 3, in the embodiment, the antenna module 130 includes a first radiator 131 (positions A1, A2), a second radiator 132 (positions A3, A2, A4, A6), a third radiator 133 (positions G1, A4), a fourth radiator 134 (positions G2, A5), and a fifth radiator 135 (positions G1, B, G2).

The first radiator 131 has a feeding end (position A1). The second radiator 132 is connected to the first radiator 131 and has a contact portion 132*a*. In the embodiment, the antenna module 130 is connected to the conductor 140 at the contact portion 132*a* to have connection with the metal back cover 110. The contact portion 132*a* is disposed between a portion of the second radiator 132 connected to the third radiator 133 and a portion of the second radiator 132 connected to the fourth radiator 134. The width L14 of the contact portion 132*a* is about 4 mm.

The second radiator 132 includes a third end (position A3) and a fourth end (position A6) opposite to each other. The fourth radiator 134 is close to the fourth end (position A6) and away from the third end (position A3). The distance L16 between the contact portion 132*a* and the third end (position A3) ranges from 25 mm to 35 mm, for example, 30 mm. The distance L15 between the contact portion 132*a* and the fourth end (position A6) ranges from 7 mm to 15 mm, for example, 10.5 mm.

The third radiator 133 is connected to the second radiator 132 and disposed beside the first radiator 131. The third radiator 133 has a first grounding terminal (position G1). The first radiator 131, the second radiator 132, and the third radiator 133 resemble a shape of π.

The fourth radiator 134 is connected to the second radiator 132. The third radiator 133 is disposed between the first radiator 131 and the fourth radiator 134. The fourth radiator 134 has a second grounding terminal (position G2).). The fifth radiator 135 connects the third radiator 133 and the fourth radiator 134. Such configuration allows the antenna module 130 to have the characteristics of a Wi-Fi 6E broadband antenna.

Specifically, the first radiator 131, the second radiator 132, and the third radiator 133, which resemble a shape of π and form a first loop, are connected to the portion of the metal back cover 110 around the edge of the slot 112 through the conductor 140 at the contact portion 132*a* so the central frequency and impedance matching of Wi-Fi 2.4 GHz (2400-2500 MHz) and Wi-Fi 5 GHz (5000-5500 MHz) can be adjusted.

In addition, the first radiator 131, the second radiator 132, and the fourth radiator 134 (which also resemble a shape of π and the path of the positions A1, A2, A4, A5 and G2 can be regarded as a second loop), the third radiator 133 (the path of positions A4 and G1) and the path of positions A5 and A6 may be used to adjust the central frequency and impedance matching of Wi-Fi 6 GHz (6000-7125 MHz).

In addition, the path of positions A1, A2, A4, B, G2 (i.e., a third loop) and the third radiator 133 (the paths of positions A4 and G1) may be used to adjust the central frequency and impedance matching of Wi-Fi 5 GHz and Wi-Fi 6 GHz (5500-6000 MHz).

Therefore, the antenna module 130 copes with the slot 112 of the metal back cover 110 to form a Wi-Fi 6E antenna using multiple pattern paths, such as the π-shaped first loop, the second loop, and the third loop, and its high frequency band can cover a bandwidth of 5150-7125 MHz.

In addition, the antenna module 130 is connected to the metal back cover 110 through the conductor 140 at the contact portion 132*a*, so that the antenna module 130 and the slot 112 have a coupling effect, and the impedance matching of the resonance frequency band is relatively stable. The design that a certain distance is kept between the antenna module 130 and the metal back cover 110 is also different from the conventional resonance mechanism in which the antenna is close to the slot 112. Unlike the conventional slot design, its coupling distance has problems with a large assembly tolerance, causing frequency offset, poor performance, or excessive maximum gain for antenna.

Note that, referring to FIG. 1 and FIG. 3, the antenna modules 130 are three-dimensional in the embodiment. Specifically, in FIG. 3, four dashed horizontal lines pass through the antenna module 130 and the portion of the antenna module 130 between the first and the second dashed horizontal lines (from top to bottom) is disposed on the first surface 122 of the bracket 120 (as shown in FIG. 1). Specifically, the second radiator 132 is disposed on the first surface 122.

The portion of the antenna module 130 between the second and third dashed horizontal lines (from top to bottom) may be disposed on the second surface 124 of the bracket 120. Specifically, part of the first radiator 131, part of the third radiator 133, and part of the fourth radiator 134 are disposed on the second surface 124.

The portion of the antenna module 130 between the third and fourth dashed horizontal lines (from top to bottom) is disposed on the third surface 126 of the bracket 120 (as shown in FIG. 1). Specifically, the feeding end, the first grounding terminal, the second grounding terminal, and the fifth radiator 135 are disposed on the third surface 126.

According to FIG. 1, the portion of the antenna module 130 on the third surface 126 including the feeding end (the position A1 in FIG. 3), the first grounding terminal (position G1 in FIG. 3), and the second grounding terminal (the position G2 in FIG. 3) may face the circuit board 150.

Since the distance L8 between the circuit board 150 and the side wall 111*b* is about 4.7 mm, the portion of the antenna module 130 on the third surface 126 (including the feeding end, the first grounding terminal, and the second grounding terminal) is further away from the side wall 111*b*, compared to the circuit board 150, and this means that the distance from the feeding end, the first grounding terminal, the second grounding terminal to the side wall 111*b* is greater than 4.7 mm.

Furthermore, the distance between the multiple points (the feeding end, the first grounding terminal, the second grounding terminal and the bottom wall 111*a*) is equal to the distance L5 minus the height L2 plus the thickness L6 and the distance L7 (L5–L2+L6+L7), which is about 3.7 mm. Therefore, the distance between the multiple points (the feeding end, the first grounding terminal, the second grounding terminal and the slot 112) is at least greater than 3.5 mm and ranges from 3.5 mm and 10 mm. This results in a certain distance between the multiple points (the feeding end, the first grounding terminal, the second grounding terminal of the antenna module 130 and the metal back cover 110), thereby reducing the influence of the metal back cover 110 on the performance of the antenna module 130.

Figure 4:
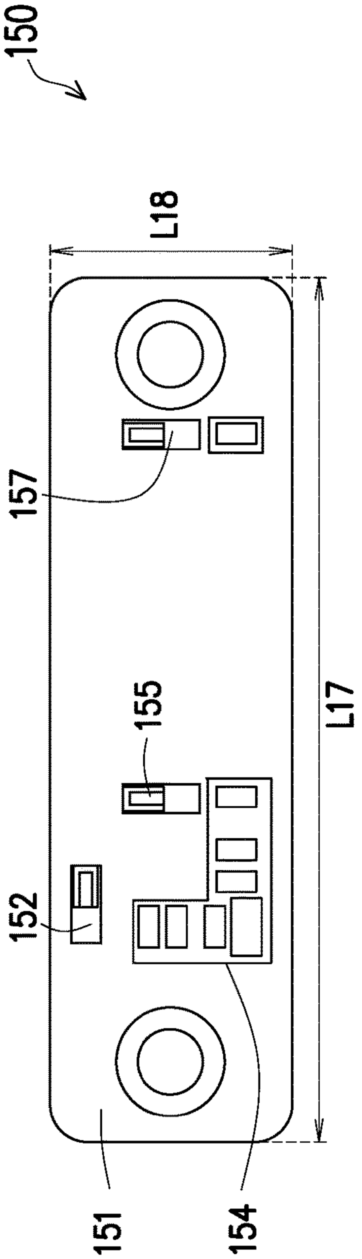
FIG. 4 is a schematic view of a top surface of a circuit board of the electronic device of FIG. 1.
Figure 5:
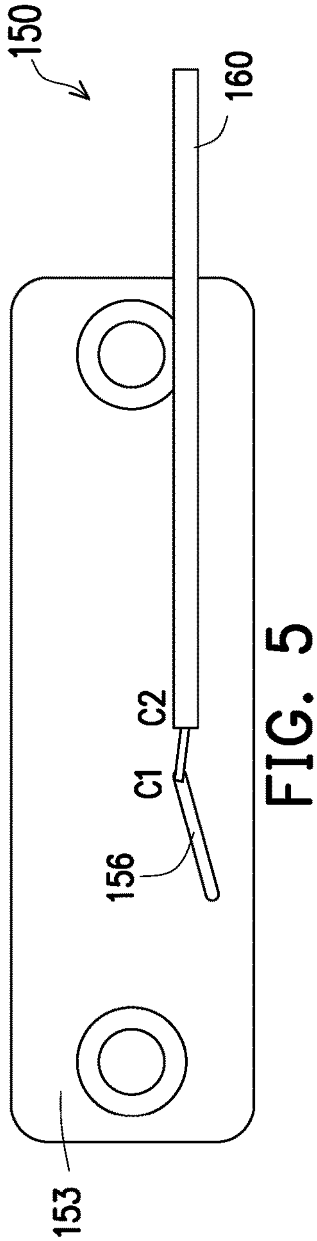
FIG. 5 is a schematic view of a bottom surface of the circuit board of the electronic device of FIG. 1.
Figure 6:
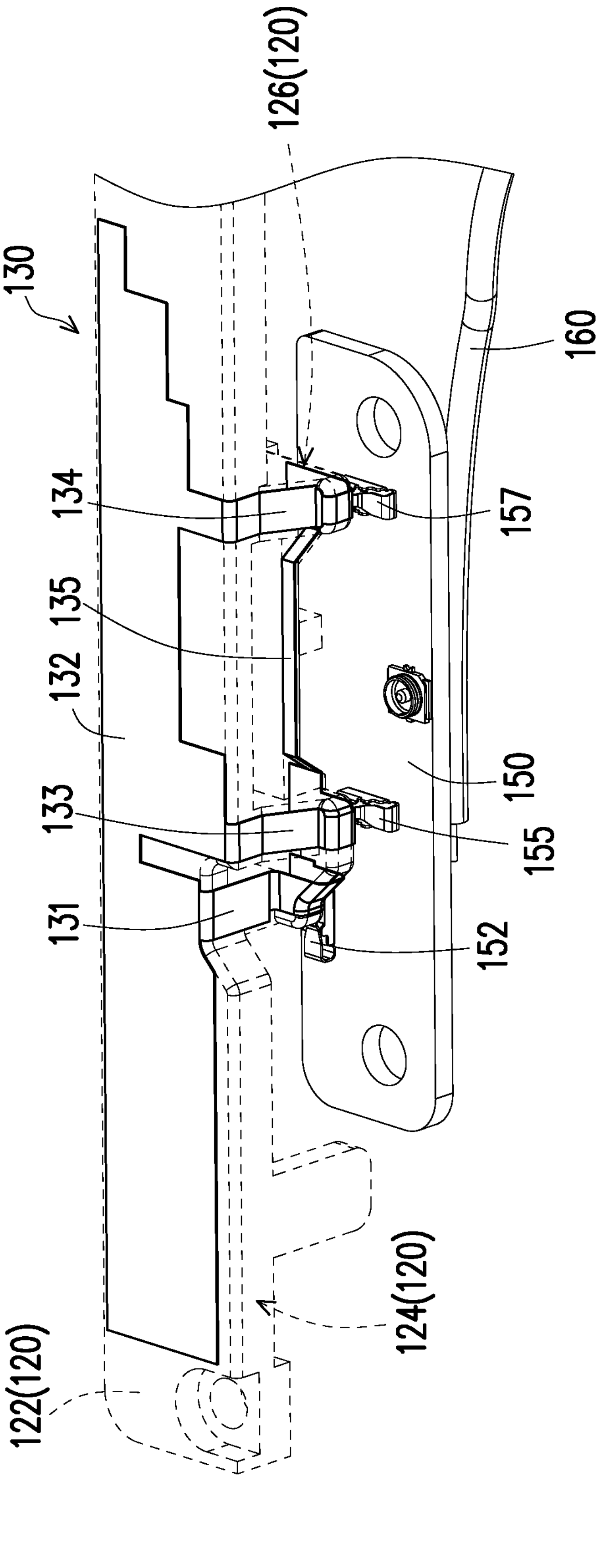
FIG. 6 is a schematic perspective view of the antenna module and the circuit board of the electronic device of FIG. 1.

FIG. 4 is a schematic view of a top surface of a circuit board of the electronic device of FIG. 1. FIG. 5 is a schematic view of a bottom surface of the circuit board of the electronic device of FIG. 1. FIG. 6 is a schematic perspective view of the antenna module and the circuit board of the electronic device of FIG. 1.

Referring to FIG. 4 and FIG. 6, in the embodiment, three elastic pieces 152, 155, and 157 are disposed on the top surface 151 of the circuit board 150. The feeding end (the position A1 in FIG. 3), the first grounding terminal (the position G1 in FIG. 3) and the second grounding terminal (the position G2 in FIG. 3) may be connected to the circuit board 150 through the three elastic pieces 152, 155, 157, respectively. The feeding signal of the circuit board 150 is thereby transmitted to the antenna module 130, so that the power of the antenna module 130 is convergent on the front surface (Z axis) of the electronic device 100.

In addition, as shown in FIG. 4, in the embodiment, the length L17 of the circuit board 150 is, for example, 28 mm. The width L18 is, for example, 8 mm. The circuit board 150 also includes an antenna impedance matching circuit 154. The three elastic pieces 152, 155, and 157 each are connected to the antenna impedance matching circuit 154 (inductor or capacitor), which can be used to have better the impedance matching and antenna performance for the Wi-Fi 6E antenna.

Referring to FIG. 5, a positive end C1 of a coaxial transmission line 160 is connected to the feeding end (position A1) through a line 156 and the via hole (not shown), and a negative end C2 of the coaxial transmission line 160 is connected to the first grounding terminal (the position G1) through another via hole (not shown).

Figure 8:
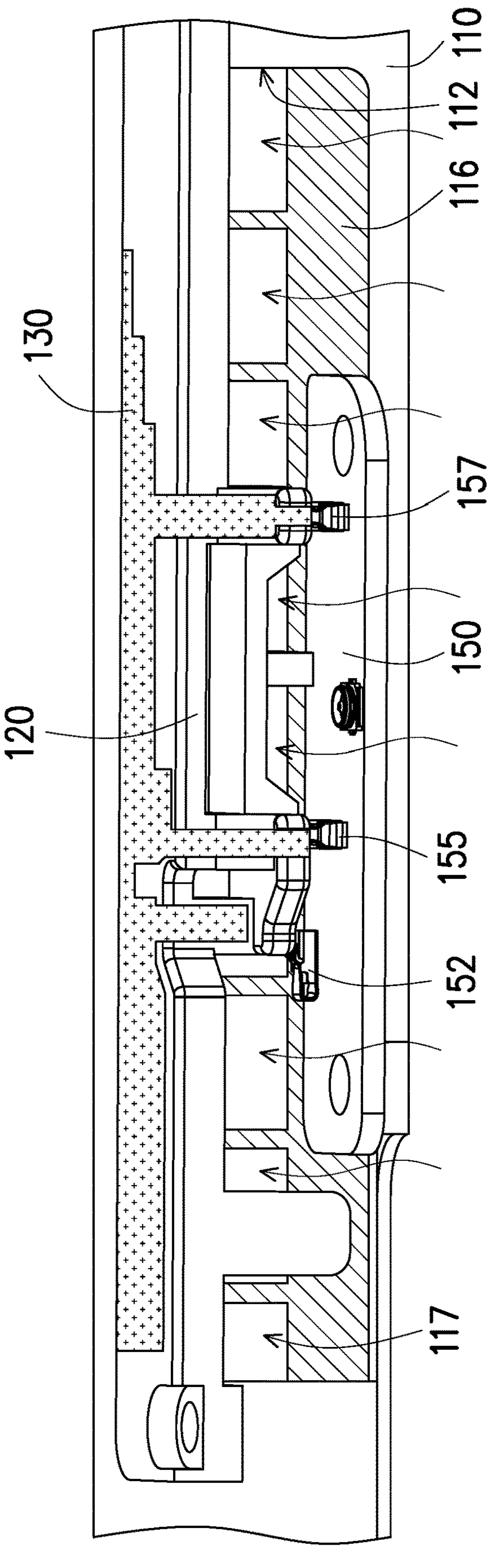
FIG. 8 is a partial view of part of the electronic device of FIG. 1 from inside-out perspective.

FIG. 7 is a partial view of a side wall of the electronic device of FIG. 1 from outside-in perspective. FIG. 8 is a partial view of the electronic device of FIG. 1 from inside-out perspective. Referring to FIG. 7 and FIG. 8, in the embodiment, the electronic device 100 further includes an insulating inner case 116 disposed in the metal back cover 110. The insulating inner case 116 includes multiple air outlets 117, and the positions of the air outlets 117 correspond to and communicate with the slots 112. The insulating inner case 116 can be used to enhance the structural strength, and the design with the air outlets 117 and the slots 112 of the metal back cover 110 can also contribute to the heat dissipation effect as well.

Figure 9:
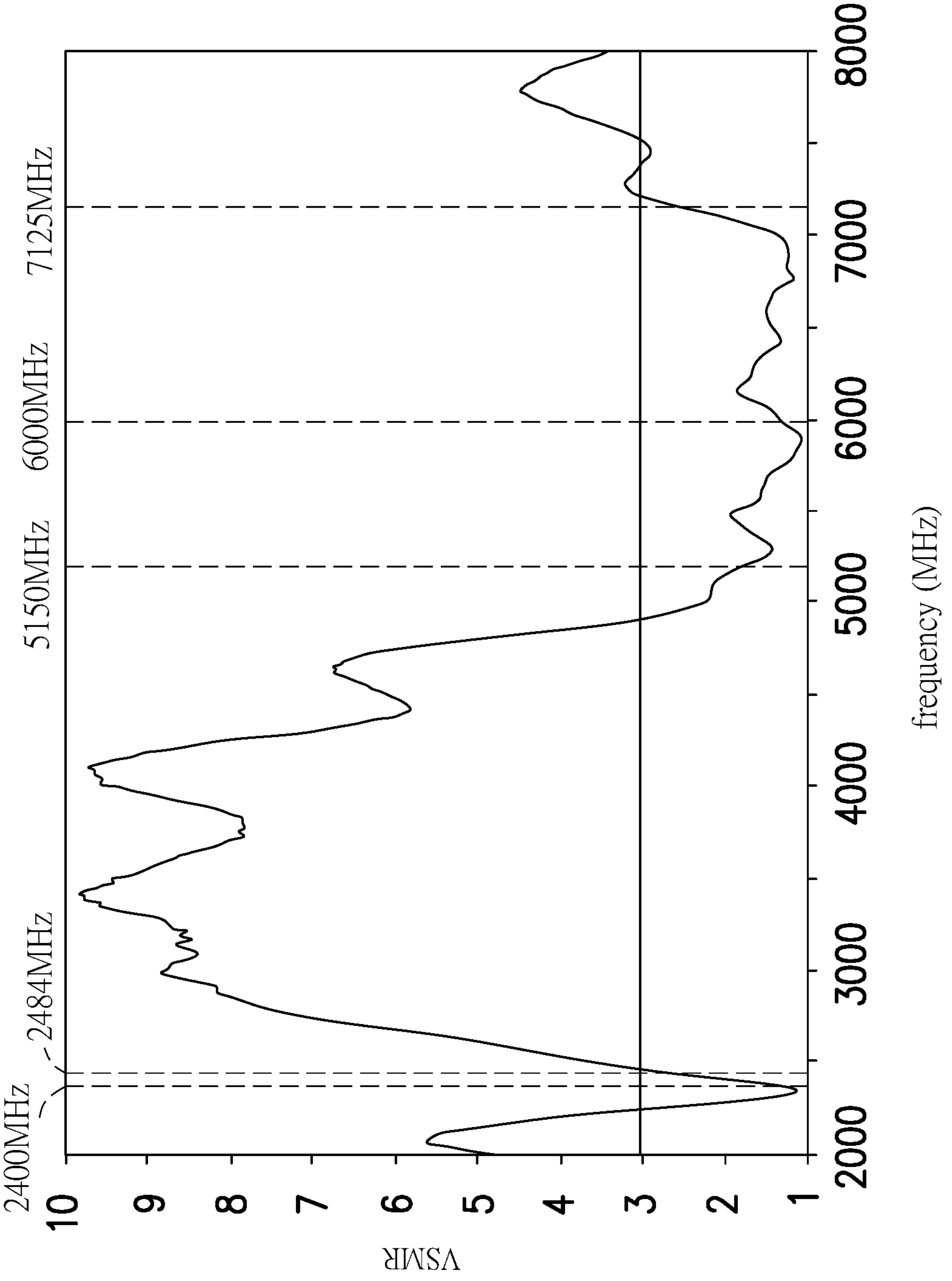
FIG. 9 is a frequency vs. VSWR plot of the antenna module of the electronic device of FIG. 1.

FIG. 9 is a frequency vs. VSWR plot for the antenna module of the electronic device of FIG. 1. Referring to FIG. 9, in the embodiment, the voltage standing wave ratio (VSWR) of the antenna module 130 is less than 3, which has favorable performance.

Figure 10:
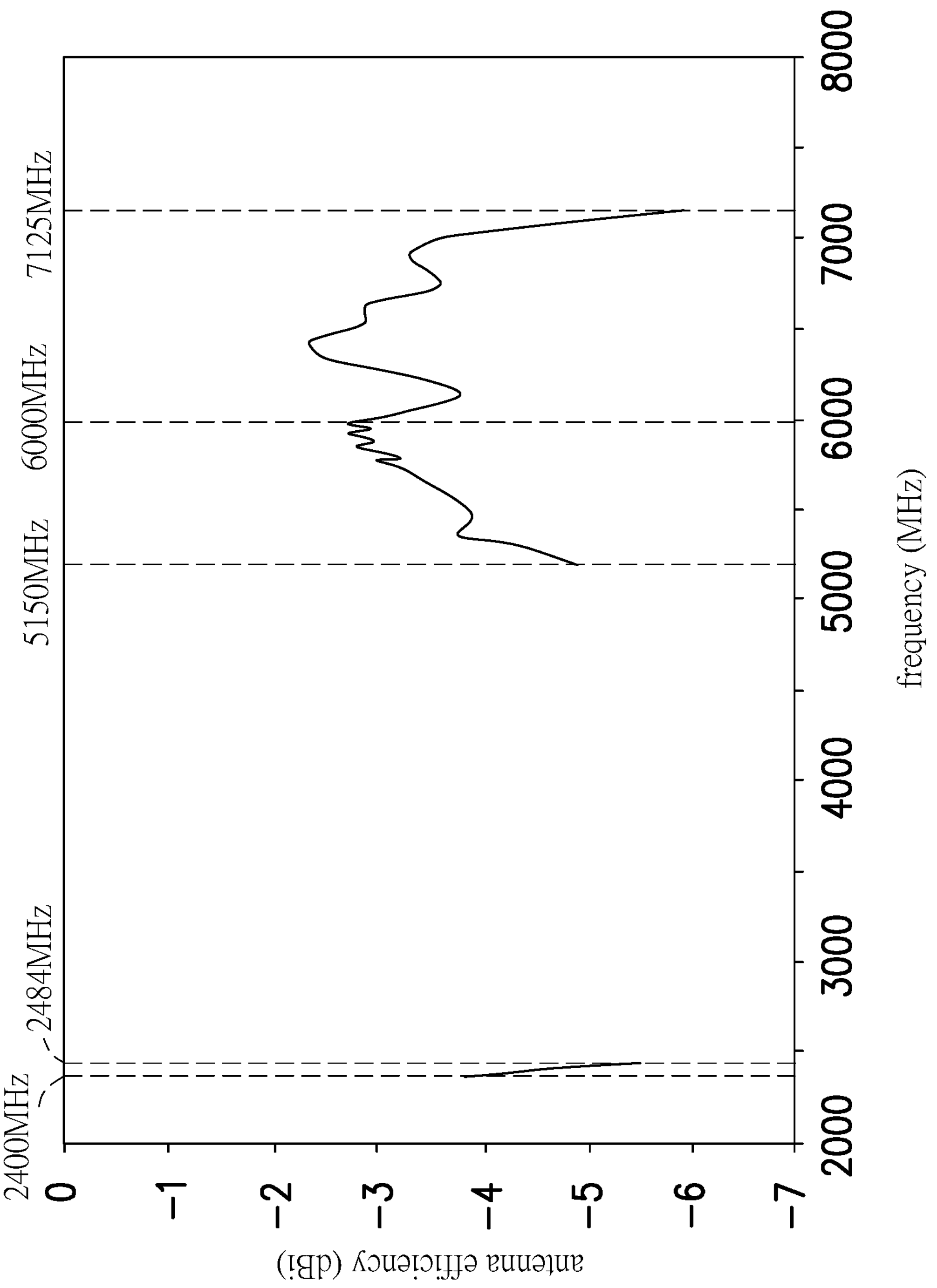
FIG. 10 is a frequency vs. antenna efficiency plot of the antenna module of the electronic device of FIG. 1.

FIG. 10 is a frequency vs. antenna efficiency plot for the antenna module of the electronic device of FIG. 1. Referring to FIG. 10, in the embodiment, the antenna efficiency of the antenna module 130 ranges from −3.8 to −5.5 dBi at Wi-Fi 2.4 GHz, and the antenna efficiency ranges from −2.8 to −5.9 dBi at Wi-Fi 5 GHz and 6 GHz. With the restriction that the electronic device 100 has the metal back cover 110, the antenna module 130 has favorable performance.

In summary, the electronic device of the disclosure adopts a metal back cover and has a high-quality appearance. In a conventional electronic device with a metal back cover, the antenna performance is affected by the metal back cover, and the power of the antenna module may be convergent in the direction toward the front of the electronic device. In the electronic device of the disclosure, a slot is disposed on the metal back cover, so that the power of the antenna module is not convergent in a single axis, and the antenna performance can be improved. In addition, with the design that the antenna module is connected to the metal back through the contact portion, the signal coverage can be increased in the direction toward the sidewall of the electronic device. Furthermore, since the distance between the slot and any one of the feeding end, the first grounding terminal, and the second grounding terminal of the antenna module in the metal back cover ranges from 4.5 mm to 10 mm, and here is a certain distance kept between the antenna module and the metal back cover, the metal back cover has less effect on the performance of the antenna module, which is also different from the conventional resonance mechanism in which the antenna is closely bonded to the slot for coupling. In addition, the design of the antenna module can excite and resonate at Wi-Fi 6E frequency band (5150-7125 MHz).

What is claimed is:

1. An electronic device, comprising:

a metal back cover comprising a slot; and an antenna module disposed in the metal back cover, wherein the antenna module comprises:

a first radiator with a feeding end;

a second radiator physically connected to the first radiator and comprising a contact portion, wherein the contact portion is connected to the metal back cover;

a third radiator physically connected to the second radiator and disposed beside the first radiator, wherein the third radiator comprises a first grounding terminal;

a fourth radiator physically connected to the second radiator, wherein the third radiator is disposed between the first radiator and the fourth radiator, and the fourth radiator comprises a second grounding terminal; and a fifth radiator physically connected to the third radiator and the fourth radiator, wherein the feeding end, the first grounding terminal, and the second grounding terminal are all apart from the slot in a distance ranging from 3.5 mm to 10 mm so that the metal back cover has less effect on performance of the antenna module.

2. The electronic device according to claim 1, wherein the metal back cover comprises a bottom wall and a side wall connected to the bottom wall, and the slot is formed between the bottom wall and the side wall.

3. The electronic device according to claim 2, wherein the contact portion is connected to the metal back cover through a conductor, the slot comprises a first end and a second end opposite to each other, a distance between a projection of the conductor onto the bottom wall and a projection of the first end onto the bottom wall ranges from 45 mm to 55 mm, and a distance between the projection of the conductor onto the bottom wall and a projection of the second end onto the bottom wall ranges from 15 mm and 25 mm.

4. The electronic device according to claim 1, wherein the antenna module excites at a frequency band, and a length of the slot ranges from 0.5 times a wavelength of the frequency band to 0.75 times the wavelength of the frequency band.

5. The electronic device according to claim 1, wherein the contact portion is connected to the metal back cover through a conductor, and the contact portion is disposed between a portion of the second radiator connected to the third radiator and a portion of the second radiator connected to the fourth radiator.

6. The electronic device according to claim 5, wherein the second radiator comprises a third end and a fourth end disposed opposite to each other, the fourth radiator is close to the fourth end and away from the third end, a distance between the contact portion and the third end ranges from 25 mm and 35 mm, and a distance between the contact portion and the fourth end ranges from 7 mm to 15 mm.

7. The electronic device according to claim 1, further comprising a bracket and a circuit board, wherein the bracket and the circuit board are disposed in the metal back cover, the antenna module is disposed on a plurality of surfaces of the bracket, and the feeding end, the first grounding terminal, and the second grounding terminal face and are connected to the circuit board.

8. The electronic device according to claim 7, wherein the surfaces of the bracket comprise a first surface, a second surface, and a third surface connected in sequence; the third surface is close to the circuit board; the first surface is away from the circuit board; the second radiator is disposed on the first surface; part of the first radiator, part of the third radiator, and part of the fourth radiator are disposed on the second surface; and the feeding end, the first grounding terminal, the second grounding terminal, and the fifth radiator are disposed on the third surface.

9. The electronic device according to claim 8, wherein the metal back cover comprises a bottom wall, and a distance between the first surface and the bottom wall ranges from 6 mm to 10 mm.

10. The electronic device according to claim 1, further comprising an insulating inner case disposed in the metal back cover, wherein the insulating inner case comprises a plurality of air outlets, the air outlets are connected to the slot, and the insulating inner case is plastic.

* * * * *